(12) United States Patent
Hoeting et al.

(10) Patent No.: US 8,721,479 B2
(45) Date of Patent: May 13, 2014

(54) BELT TENSIONING DEVICE

(75) Inventors: Stephen C. Hoeting, Maineville, OH (US); Brian P. Schloemer, Amelia, OH (US)

(73) Assignee: Setco Sales Company, Cincinnati, OH (US)

( * ) Notice: Subject to any disclaimer, the term of this patent is extended or adjusted under 35 U.S.C. 154(b) by 341 days.

(21) Appl. No.: 13/062,621

(22) PCT Filed: Sep. 4, 2009

(86) PCT No.: PCT/US2009/056067
§ 371 (c)(1),
(2), (4) Date: Mar. 7, 2011

(87) PCT Pub. No.: WO2010/028263
PCT Pub. Date: Mar. 11, 2010

(65) Prior Publication Data
US 2011/0165980 A1    Jul. 7, 2011

Related U.S. Application Data

(60) Provisional application No. 61/094,637, filed on Sep. 5, 2008.

(51) Int. Cl.
*F16H 7/08*    (2006.01)
*F16D 7/04*    (2006.01)

(52) U.S. Cl.
USPC .......................................... 474/114; 192/56.1

(58) Field of Classification Search
USPC ........ 474/114; 192/56.1; 464/37; 254/54, 67, 254/98
See application file for complete search history.

(56) References Cited

U.S. PATENT DOCUMENTS

| | | | |
|---|---|---|---|
| 3,295,383 A | | 1/1967 | Allen |
| 3,593,542 A | * | 7/1971 | Urayama ...................... 464/37 |
| 3,890,859 A | * | 6/1975 | Grabovac et al. ............... 81/474 |
| 4,017,059 A | * | 4/1977 | Laine ............................ 254/231 |
| 4,215,600 A | | 8/1980 | Kesselman |
| 4,290,516 A | | 9/1981 | West et al. |
| 4,311,224 A | | 1/1982 | Kato et al. |
| 4,386,689 A | | 6/1983 | Kato |
| 4,583,961 A | * | 4/1986 | Kawasawa et al. ........... 474/113 |
| 4,631,044 A | * | 12/1986 | Redmon ....................... 474/114 |
| 4,792,321 A | | 12/1988 | Lundquist |
| 4,838,400 A | | 6/1989 | Fortune |

(Continued)

OTHER PUBLICATIONS

ISA/US, International Search Report, PCT/US09/056067, Nov. 2, 2009 (2 pgs).

*Primary Examiner* — Michael Mansen
*Assistant Examiner* — Mark K Buse
(74) *Attorney, Agent, or Firm* — Wood, Herron & Evans, LLP

(57) ABSTRACT

A belt tensioning device (10) prevents excess belt tension when installing a belt (16) between a driver axis (28) and a spindle axis (22). A clutch (48) supported on a fixed structure (14, 46) includes an engagement member (52, 64) and a rod (32). Rotating the engagement member (52, 64) in a first direction moves the rod (32) and the driver axis (28) in a direction away from the spindle axis (22), until further rotation causes the engagement member (52, 64) to disengage preventing further movement of the driver axis (28) in the direction away, and subsequent rotational movement of the engagement member (52, 64) in a second rotational direction moves the driver axis (28) toward the spindle axis (22).

33 Claims, 11 Drawing Sheets

(56) References Cited

U.S. PATENT DOCUMENTS

| | | |
|---|---|---|
| 5,234,089 A | 8/1993 | Itomi et al. |
| 5,271,486 A | 12/1993 | Okamoto et al. |
| 5,672,110 A | 9/1997 | Kurita et al. |
| 5,681,135 A | 10/1997 | Simonson |
| 5,916,325 A * | 6/1999 | Madrid et al. ............... 74/89.38 |
| 6,170,645 B1 | 1/2001 | Mitchell |
| 6,220,415 B1 * | 4/2001 | Cosenza ..................... 192/56.1 |
| 7,272,998 B1 | 9/2007 | Gauthier |
| 7,272,999 B2 * | 9/2007 | Cutler et al. .................... 81/475 |
| 7,275,462 B2 | 10/2007 | Faus et al. |
| 7,281,457 B2 | 10/2007 | Hu |
| 7,448,973 B2 * | 11/2008 | Simmons ..................... 474/114 |
| 2009/0062046 A1 * | 3/2009 | Lindemann .................. 474/101 |

* cited by examiner

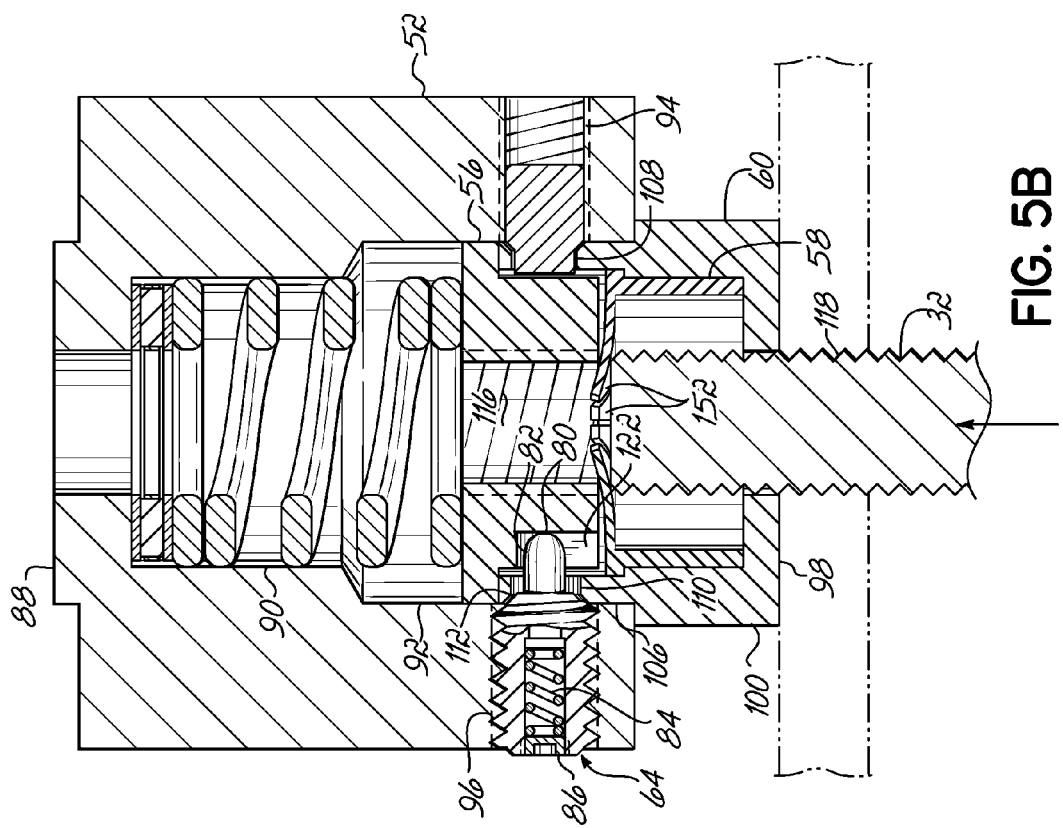
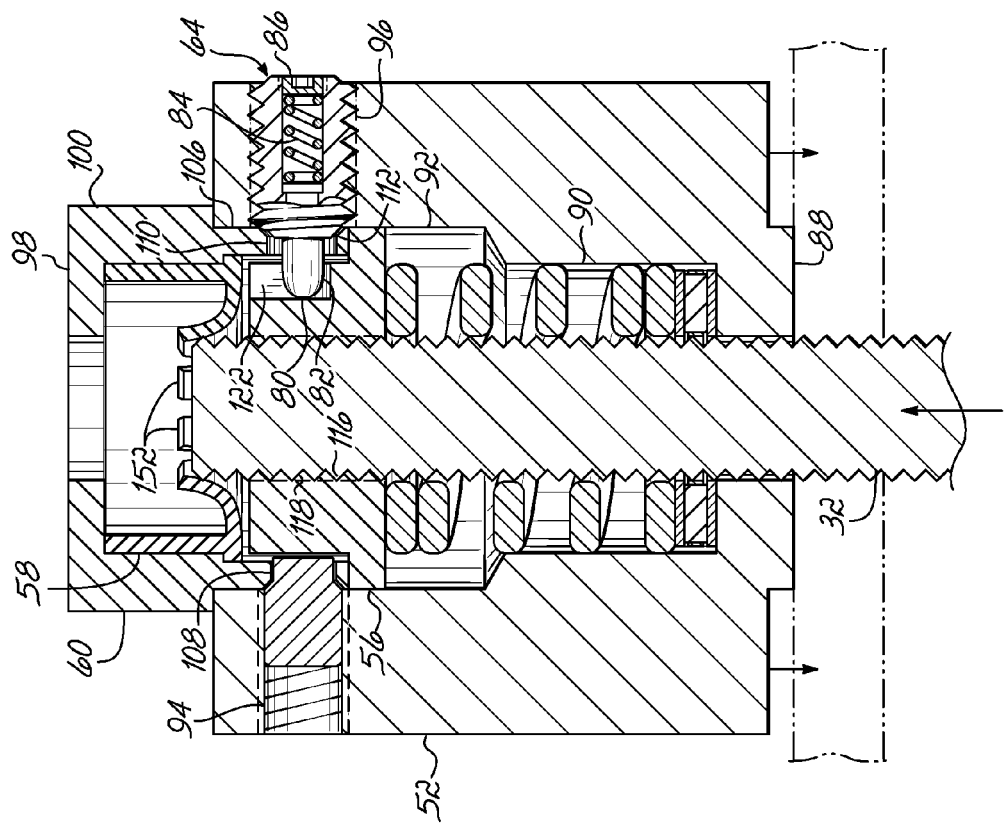
FIG. 5B
FIG. 5A

BELT TENSIONING DEVICE

This application claims priority, under Section 371 and/or as a continuation under Section 120, to PCT Application No. PCT/US09/56067, filed on Sep. 4, 2009, which claims priority to U.S. Provisional Application No. 61/094,637, filed on Sep. 5, 2008.

RELATED APPLICATION

The present application claims priority to U.S. Provisional Application Ser. No. 61/094,637 filed Sep. 5, 2008, the disclosure of which is hereby incorporated herein by reference in its entirety.

TECHNICAL FIELD

Drive belt tensioning devices and tension or load limiting devices.

BACKGROUND

Belt drives are used extensively to transmit power from a motor to rotating equipment or machinery. In the simplest example, a flat belt is wrapped around a pulley on a motor and a pulley on a shaft. The belt must have tension in order to transmit power via frictional forces from one pulley to the other pulley. The belt can slip if it is too loose for the amount of power being transmitted.

Toothed belt drives are much less susceptible to slippage. In a toothed belt drive, the pulleys and belt have teeth that engage to transmit more power with less belt tension. However, belt tension is still a necessity.

In the field of machine tool spindles, one of the most common methods of belt tensioning is to increase the center distance between the spindle shaft and the motor. More particularly, according to the method, one end of a threaded rod is fixed to a motor unit while the other end is pulled upon by a nut and bracket that is directly or indirectly attached to a spindle unit. An operator tightens the nut and thereby induces tension on the belt. Once the belt is tensioned, the motor unit is clamped in place.

The problem with this method is that operators who install or replace belts tend to over-tighten the nut and ultimately create excessive belt tension. Excessive belt tension is a major cause of premature spindle failure, which typically involve bent shafts, overloaded bearings, and the need to frequently change belts.

At first look, one might think that this is simply a matter of discipline, and that if a mechanic is provided a torque wrench and a torque value at which to turn the nut, then over tightening should never happen. With this approach, it would theoretically be possible to build some type of device that assures use of the torque wrench in this manner. To some degree this approach is valid, but it also has drawbacks.

For instance, some may believe that reaching a given torque value is all that is necessary to apply a related linear force where it is desired, and thereby move or secure objects in an expected manner. A predictable situation like this is often present on a factory assembly line where every piece is new, well lubricated, without defect, and installed with adequate access and visibility. However experienced field service mechanics know there are all kind of situations encountered in the field. For example there may be rusty or damaged threads, bowed rods, foreign material blocking smooth movement, and lack of space to use a torque wrench correctly. Many mechanics will not rely solely on a torque wrench, but will sometimes use other ways to check the results of their work. For example they may look closely at the mated parts, and perhaps perform physical measurements.

There are always times when mechanics may not have access, time, or knowledge to perform a check. In such cases they may install a belt too tightly or too loosely. Since a loose belt will be quickly apparent and troublesome and call for additional effort, a mechanic may choose to err on the side of too much belt tension. Further, if after a period of time a belt is slipping due to conditions such as wear or deterioration, some mechanics may choose to over tighten the belt rather than replace it. This is often driven by short term expediency at the expense of long-term spindle health and the related costs.

For these reasons and others, it is desirable to facilitate the proper tensioning of a new belt, and also the adjustment of an installed belt. Such a device should be relatively easy to use for tightening. When it is necessary to remove an old belt, such a device should not interfere with the mechanic's ability to use high amounts of loosening torque to overcome damage and other things that have happened during the time since the belt was installed.

SUMMARY

The invention tensions a belt by using a similar concept to that described in the background, but the invention also limits the amount of pull force on the motor unit. By applying pull force up to but not beyond a limit, belt tension is set without the possibility of too much belt tension.

The invention also has a positive drive in the loosening direction. This feature ensures the device does not become stuck on the threaded rod due to damage or defects.

The invention may be set quickly and easily at the factory for a specific load limit. Once set, the invention may readily be made tamper resistant.

The invention quickly and easily retrofits existing spindles.

BRIEF DESCRIPTION OF THE DRAWINGS

FIGS. 5A and 5B are cross sections illustrating the function of the one-way grommet.

DETAILED DESCRIPTION OF DRAWINGS

Figure 1:
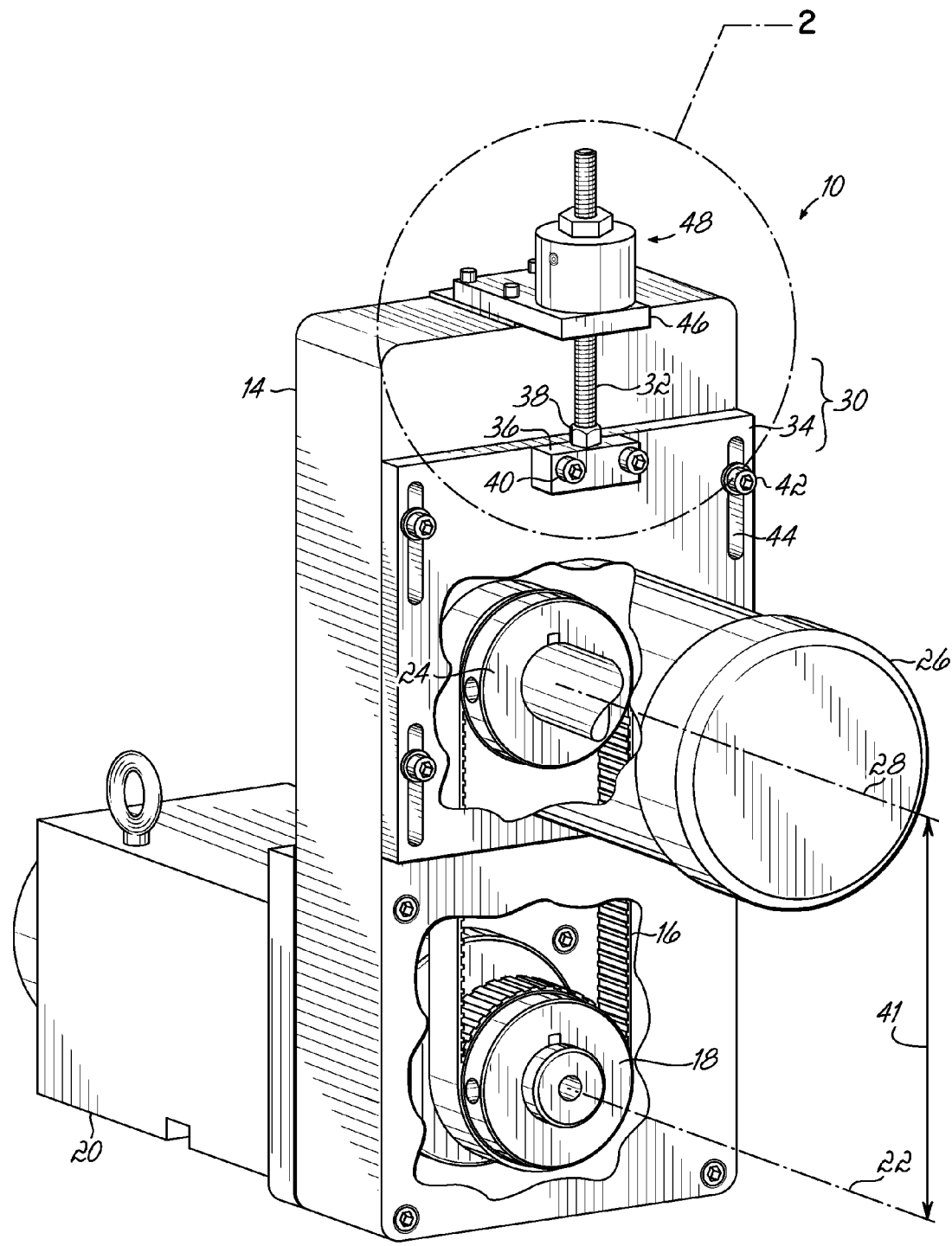
FIG. 1 illustrates a first embodiment of a belt tensioning device of one preferred embodiment of the current invention, on a machine.
Figure 2:
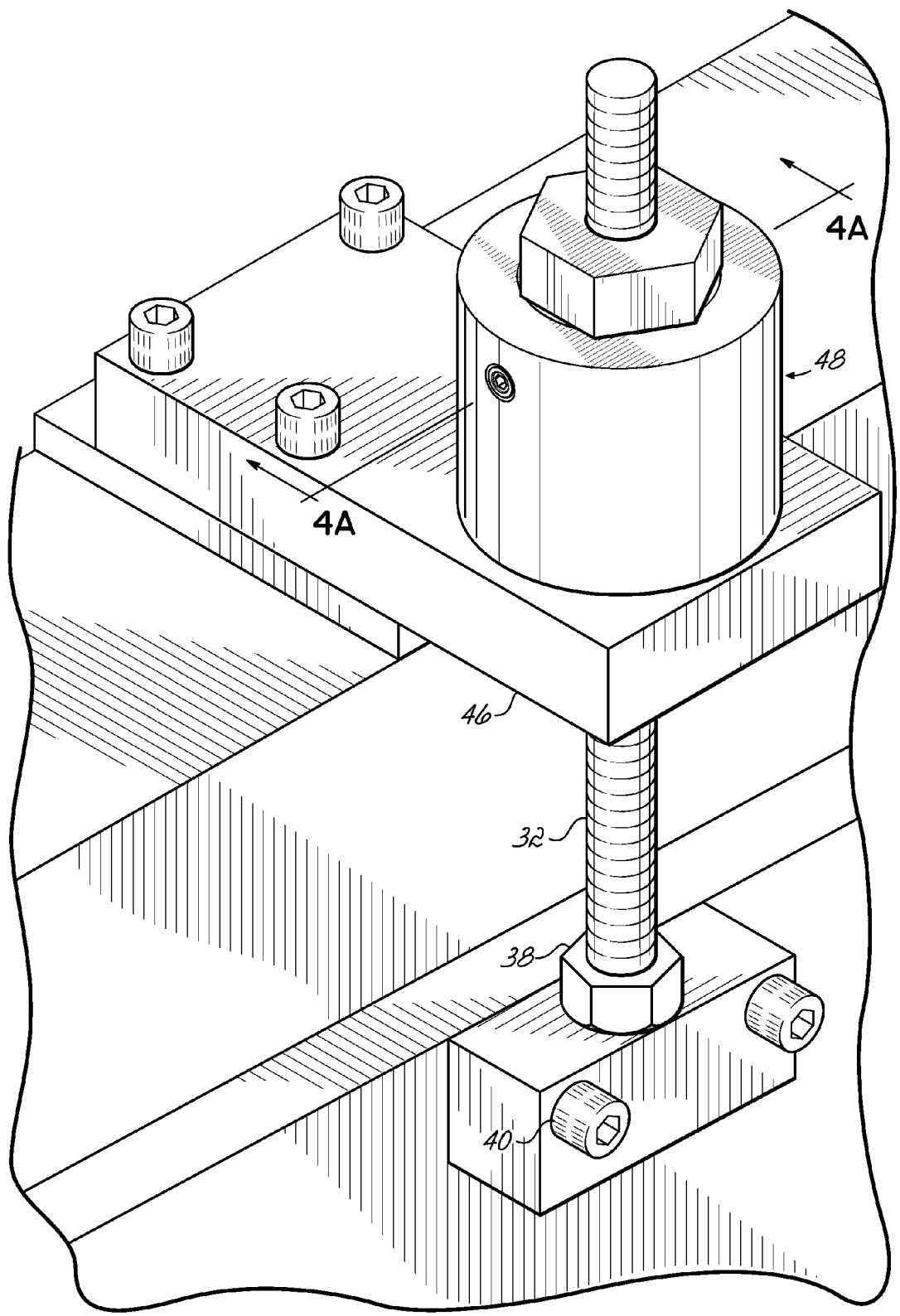
FIG. 2 is a detail view of the area indicated in FIG. 1.

FIGS. 1 and 2 illustrate a belt tensioning device 10 having a rigid structure 14 to limit the amount of belt tension that can be applied to an endless belt 16 during a belt installation. The belt 16 runs from a spindle pulley 18 on a spindle 20 having a spindle axis 22, to a drive pulley 24 on a rotation driver in the form of a motor 26 having a motor axis 28. The motor 26 is supported by a carrying structure 30. The carrying structure 30 has a threaded rod 32 extending away from the motor axis 28, preferably in a perpendicular orientation. In this embodiment, the rod 32 is attached to a sliding plate 34 by a threaded rectangular block 36, a jam nut 38, and fasteners 40. However, this connection may be made in any one of a variety of different ways as long as the rod 32 connects securely to the plate 34. The spindle axis 22 and the motor axis 28 are held at a distance 41 from each other when fasteners 42 in elongated holes 44 of the sliding plate 34 are tightened to the rigid structure 14. The rigid structure 14 includes a support plate 46 through which the rod 32 passes into a clutch 48.

One skilled in the art will realize that when the fasteners 42 are not tightened, the rod 32 carries the full weight of the carrying structure 30, motor 26, and drive pulley 24, plus a force resisting any tension in the belt 16. If the device were to be run with the fasteners 42 loose or removed, then the rod 32 would also carry dynamic forces from the rotation of the motor 26 and the spindle 20. However it is well known that for most applications, the device should only be run with the fasteners 42 tightened, so that the forces are transmitted into the rigid structure 14. The purpose of the rod 32 is to position the motor axis 28 relative to the spindle axis 22 at the time of belt installation or adjustment, with the goal of inducing a desired static tension force in the belt. The larger the distance 41 between the drive pulley 24 and the spindle pulley 18, the greater the resulting static tension in the belt. When the fasteners 42 are tightened, this static tension, sometimes referred to as pretension, remains in the belt.

The clutch 48 will now be further described with reference to FIGS. 3-5B. The clutch 48 has an outer shell 52, a tensioning member in the form of a resilient member such as a spring 54, a nut 56 sometimes referred to as a clutch nut, a flexible grommet 58 configured to be a one way insertion limiter, and a drive nut 60. It further has a set screw 62, an engagement member in the form of a spring loaded plunger 64 and a thrust bearing 66. The thrust bearing 66 includes a first washer 68, a roller bearing 70 having rollers 72 retained in a cage 74, and a second washer 76. The plunger 64 has a threaded plunger body 78, a convex plunger nose 80 at the exterior tip of a pin 82, and a spring 84 (FIG. 4A) resting against a plug 86. In some embodiments, a purchased round nosed spring plunger 64 such as from McMaster-Carr of the United States may be used.

Figure 3:
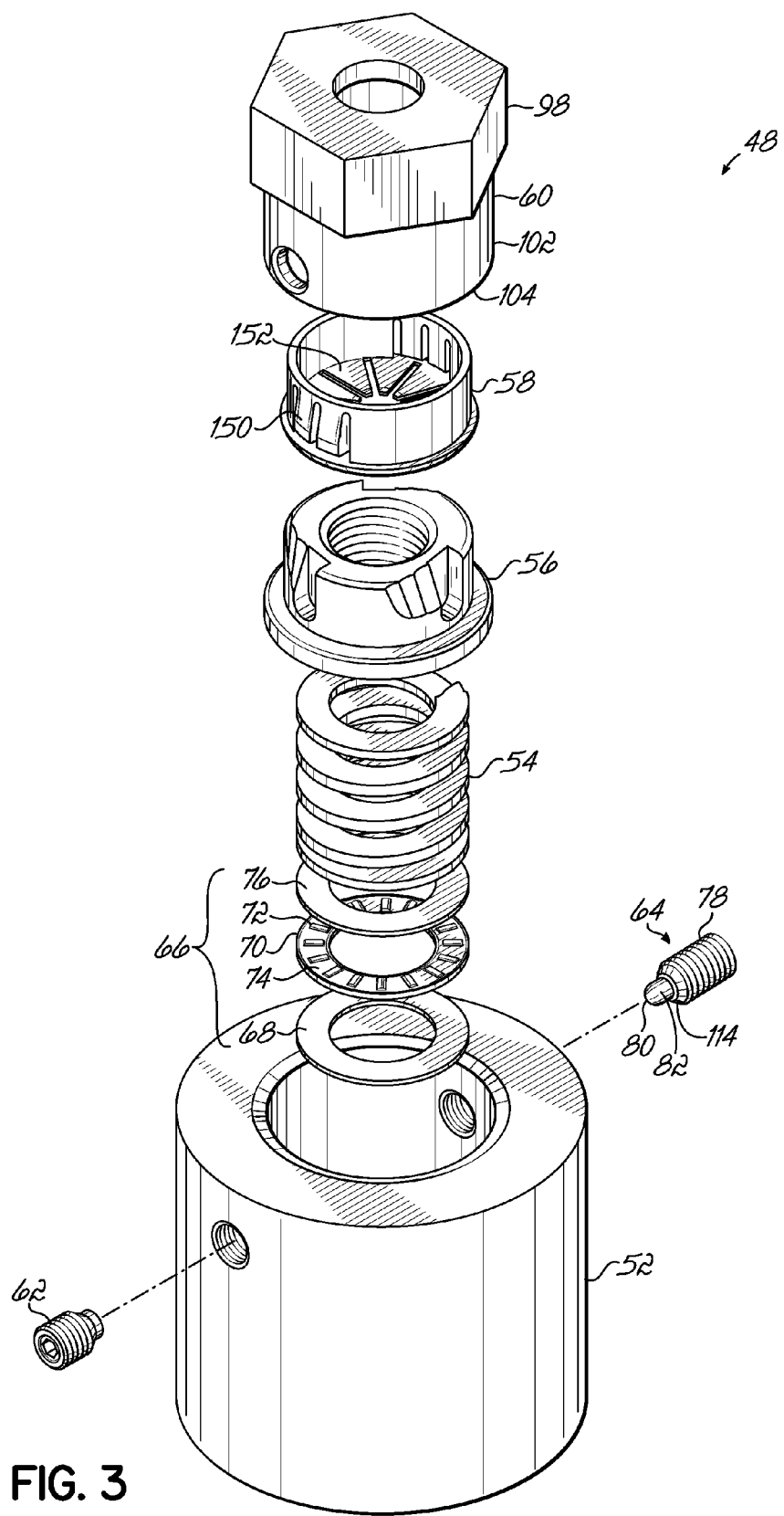
FIG. 3 is an exploded partial view of the belt tensioning device of FIG. 1.
Figure 4A:
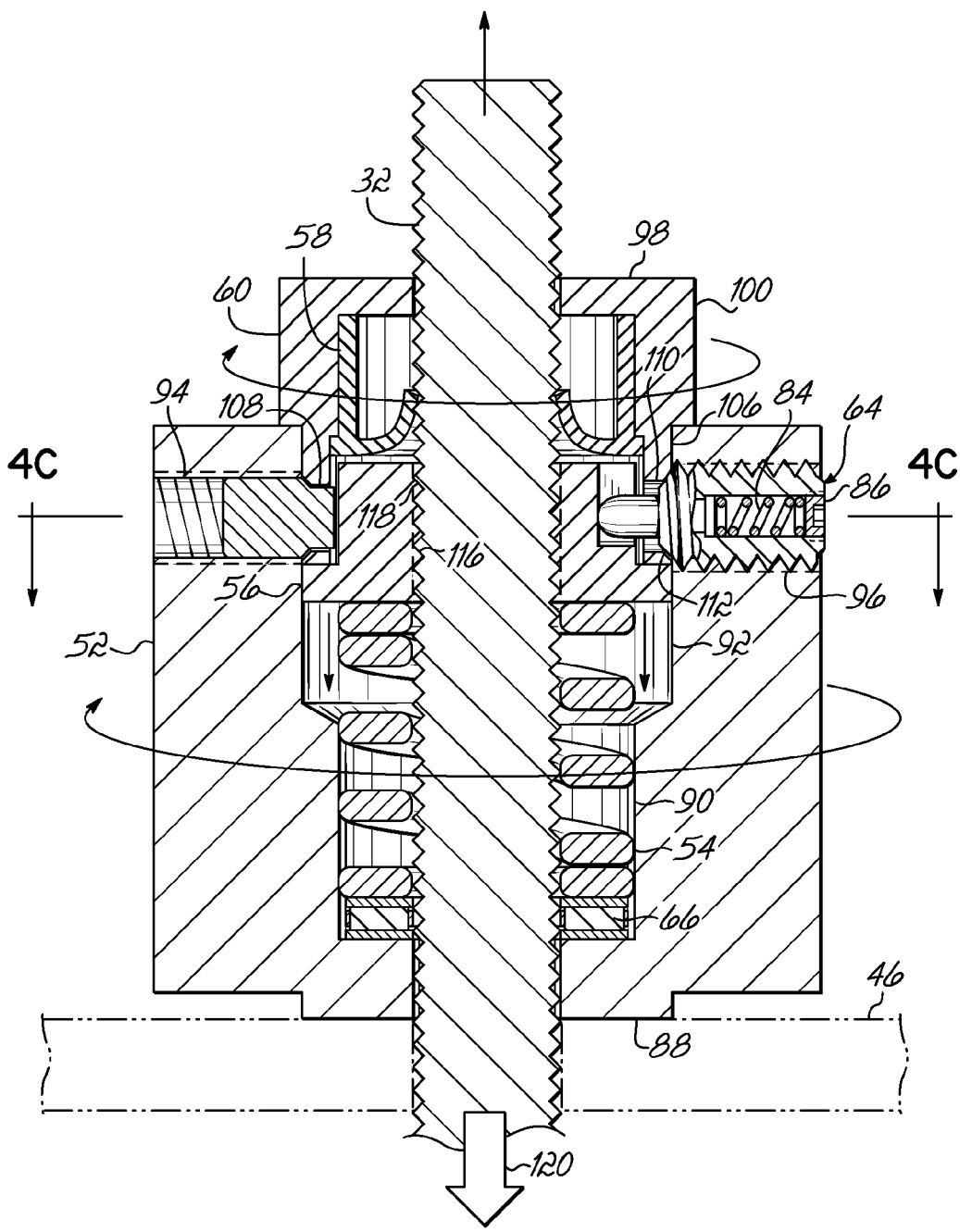
FIG. 4A is a cross section as indicated in FIG. 2, and is before or during tensioning.
Figure 4B:
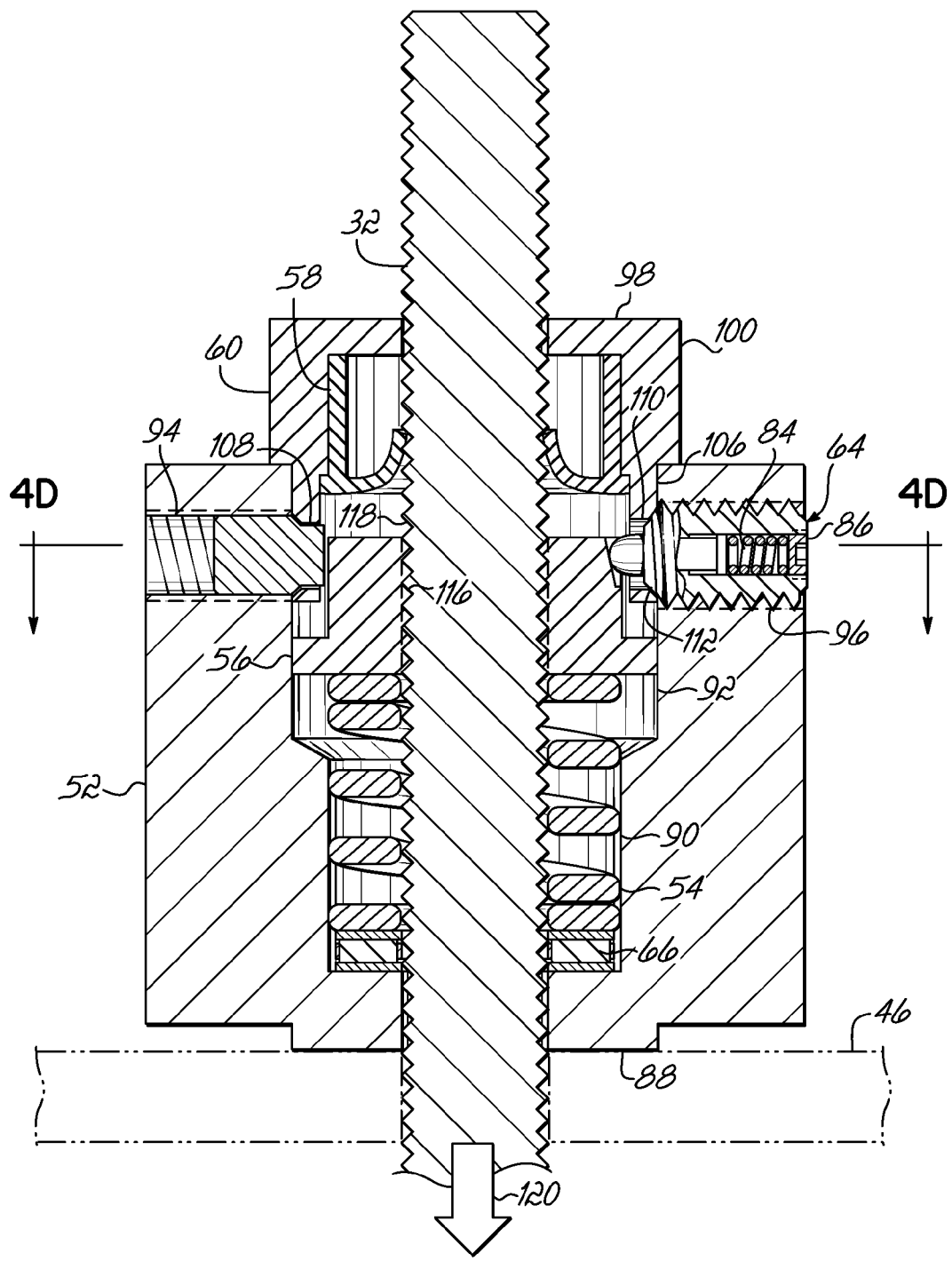
FIG. 4B illustrates the device of FIG. 4A, after maximum tensioning is achieved.
Figure 4C:
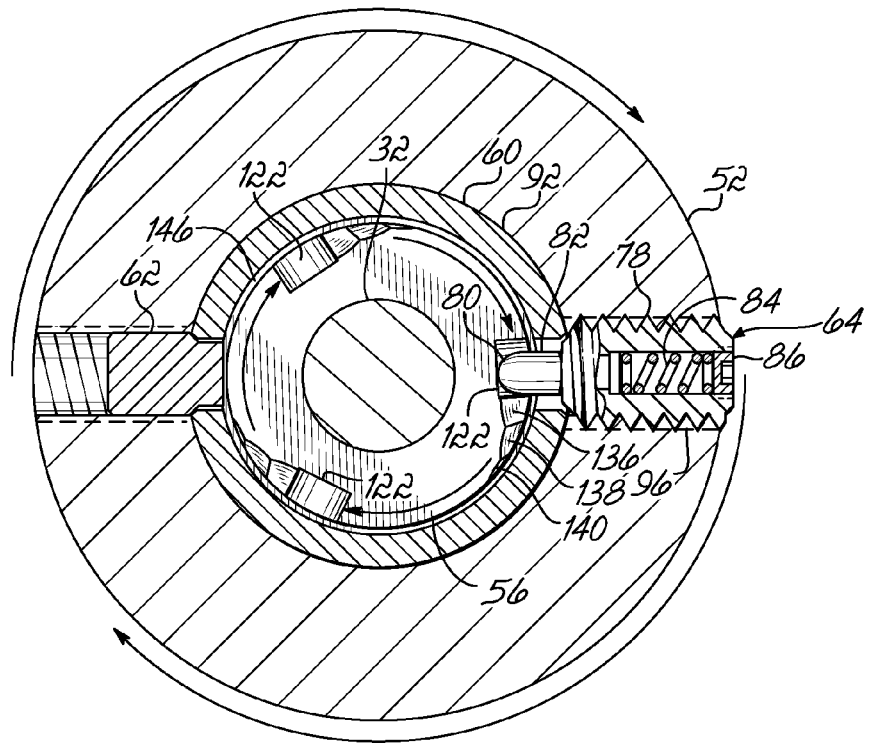
FIG. 4C is a cross section as indicated in FIG. 4A.
Figure 4D:
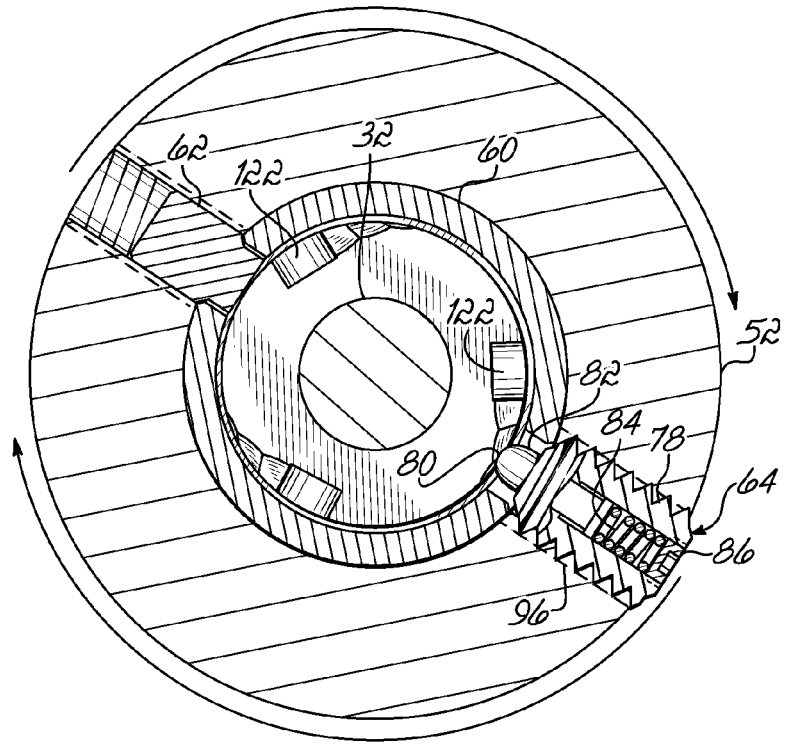
FIG. 4D is a cross section as indicated in FIG. 4B.
Figure 4E:
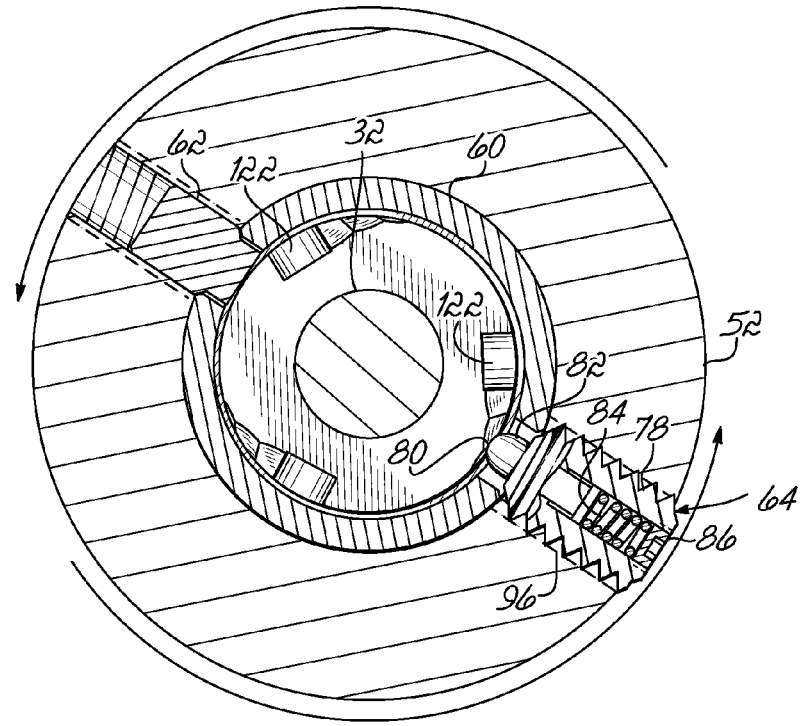
FIG. 4E is FIG. 4D, with arrows added to indicate that loosening is desired.
Figure 4F:
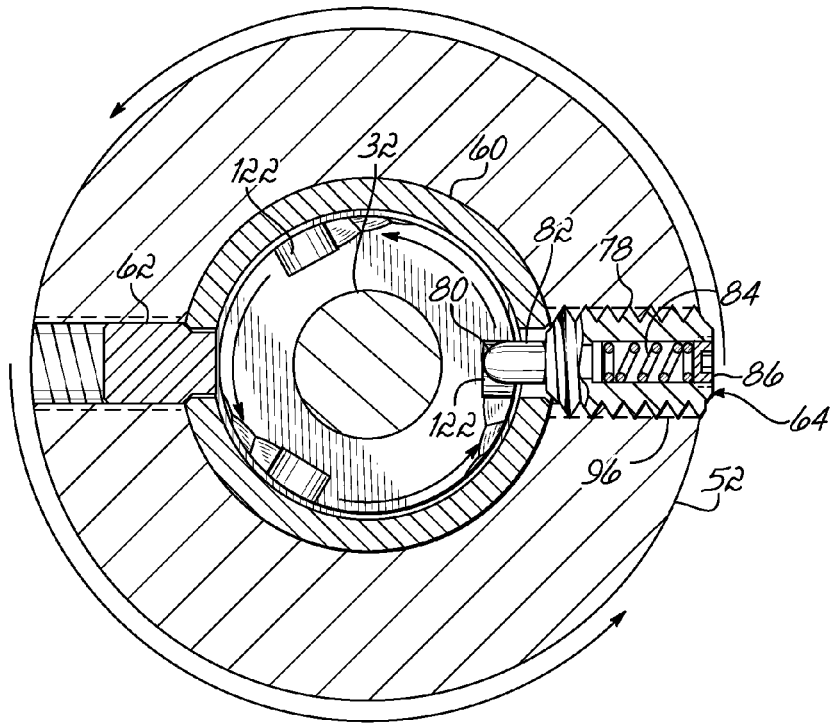
FIG. 4F is like FIG. 4E, but is illustrated during rotation to decrease the belt tension.

As seen in FIGS. 3-4A, the outer shell 52 has a bottom surface 88 that rests on the support plate 46, a spring bore 90, a nut bore 92, a threaded hole 94 for the set screw 62 and a threaded mounting recess 96 for the plunger 64. The drive nut 60 has a top portion 98 with wrenching surfaces 100, a bottom portion 102 with a bottom 104 and an outside diameter 106 sized to fit snugly in the nut bore 92. It further has a drive hole 108 sized to snugly receive the set screw 62, and a drive hole 110 with a chamfer 112 sized to snugly receive a chamfer portion 114 of the plunger body 78. It is helpful to understand that although the current embodiment has three pieces—the outer shell 52, drive nut 60, and set screw 62, once assembled in the clutch 48 they function as one, and do not have any relative movement between them. The drive nut 60 provides access to assemble the internal components of the clutch 48. In other embodiments the drive nut 60 and set screw 62 may be eliminated if other assembly access is provided. For example, access may be provided by a split outer shell. In other embodiments the drive nut 60 may not have wrench flats, and instead wrench flats or other tool features may be part of the outer shell 52. The relatively small size of the drive nut 60 as illustrated allows it to be turned by a wrench that is commonly carried by a mechanic, whereas the larger outer shell 52 may not be so easily adapted to accommodate a small and common wrench.

As seen in FIG. 4A, one face of the thrust bearing 66 is seated in the spring bore 90 with the other face supporting the spring 54. The top of the spring 54 supports the nut 56. The nut 56 has threads 116 that engage threads 118 of the rod 32, and the rod 32 carries a force 120 as indicated by the large arrow. The force 120 is balanced by an upward force of the spring 54, as it resists compression by the nut 56. This is true at all times, whether the spring 54 is at its free standing height, or whether its height is reduced by compression. Assuming the spring 54 has started to compress, the greater the force 120, for example due to more belt tension, the smaller the height of the spring 54, and the closer the nut 56 moves towards the bottom surface 88 of the outer shell 52. The significance of this movement will become apparent upon further explanation with reference to later figures.

Figure 3A:
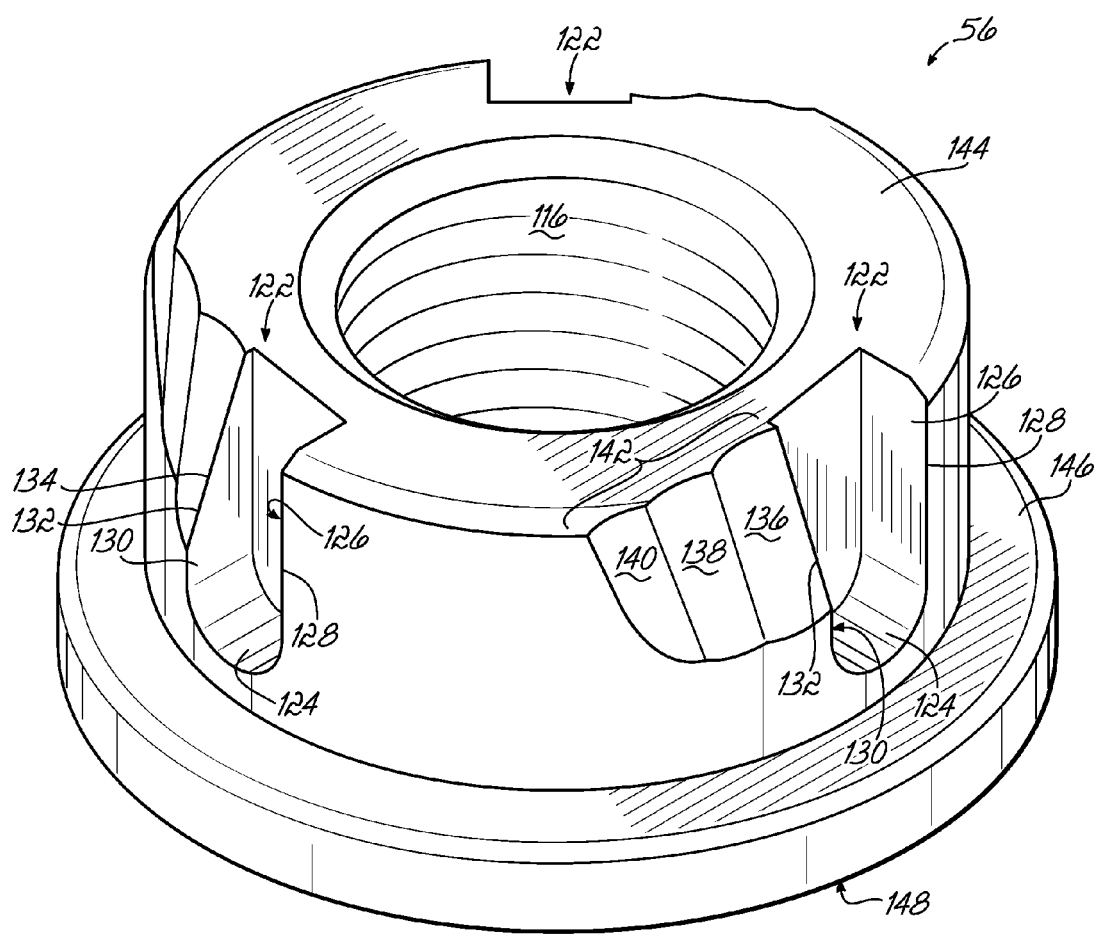
FIG. 3A is an enlarged detail view of the nut shown in FIG. 3.

As best seen in FIG. 3A, the nut 56 has three slots 122. Each slot 122 has a bottom 124, a full wall 126 having a straight edge 128 on one side (loosening direction), and a partial wall 130 having an angled edge 132 on the side opposite (tightening direction). Angled edge 132 may be rounded to reduce local stress. Along the angled edge 132 is a critical point 134. The critical point 134 is not identifiable as a visible feature, but is defined as the point at which the wall radial height is just short enough to allow the plunger nose 80 to ride over the angled edge 132, as will be later described. Adjacent the angled edge 132 is a first relief scallop 136 with two more relief scallops 138, 140 illustrated next to the first. The taper angle, defined as the angle of the scallop to a bottom surface 148, is increased with each progression away from the slot 122 to aid slippage of plunger nose 80 that will be later described. For example, the angle of scallop 136 may be 60 degrees, the angle of scallop 138 may be 70 degrees, and the angle of scallop 140 may be 81 degrees. The scallops as a group may be collectively referred to as a drive relief 142. Embodiments with more scallops, each one smaller than those illustrated have also been envisioned, as well as a drive relief 142 that is a smooth curved surface of progressively increasing taper. The nut 56 further has a top 144 and a seat 146.

Usage and function of the belt tension device with the clutch 48 will now be described. This description is for a clutch 48 that has been set and calibrated to deliver a desired maximum static belt tension. Methods of calibration will be described later.

The description begins with a new un-stretched belt 16 loosely placed around the drive pulley 24 and the spindle pulley 18. Fasteners 42 are loose and the sliding plate 34 is positioned close enough to the spindle axis 22 to accommodate the belt 16. To begin the tensioning process the drive nut 60 is turned clockwise with a wrench. The torque from the wrench is transmitted from the drive nut 60 through the set screw 62 to turn the outer shell 52. Some of the torque may also be transmitted through the chamfer portion 114 of the plunger 64, but this is not essential. In the beginning (FIGS. 4A and 4C), the seat 146 is positioned against the bottom 104 of the drive nut 60 by the spring 54. As the outer shell 52 turns, the side of the plunger pin 82 drives the partial wall 130 turning the nut 56. As the drive nut 60 and outer shell 52 rotate as a unit, the plunger 64 rotates the nut 56 an equal amount. The threads 116 of the nut 56 acting on the threads 118 drive the rod 32 upwards, lifting the carrying structure 30 and taking slack out of the belt 16. At all times the rod 32 does not rotate. For every full turn of the drive nut 60, the rod 32 moves through the nut 56 a distance of one thread pitch. The motor axis 28 is lifted away from the spindle axis 22 a distance equal to one thread pitch, removing slack from the belt 16. As the belt further tensions, the tension of the belt adds to the weight of the motor 26, drive pulley 24, and carrying structure 30 and are collectively represented by force 120 (FIG. 4A). An equal force is transmitted by the bottom of the nut 56 to the top of the spring 54. Therefore, the tension in the belt is equal to the force on the spring 54 minus the weights. Because the weights of motor 26, drive pulley 24, and carrying structure 30 are constant for any given device 10, a compression force applied to the spring 54 corresponds to a calculable belt tension. At a desired belt tension limit, additional loading of the spring 54 is impossible, for reasons that will be described, thus setting and not exceeding the desired belt tension.

The clutch 48 achieves the above as follows. In the beginning, as seen in FIG. 4A, the nut 56 is high and close to the drive nut 60, bringing the critical point 134 well above, and the slot bottom 124 near, the plunger nose 80. As the wrench is turned and the plunger pin 82 drives the clutch nut thereby raising the motor axis 28 away from the spindle axis 22, the increasing belt tension compresses the spring 54, lowering the nut 56 and bringing the critical point 134 towards the plunger nose 80. At the critical point 134 the radial height of the partial wall 130 is just short enough to allow the plunger nose 80 to ride over the angled edge 132, depressing and disengaging the pin 82 from driving the nut 56. Once disengaged, the plunger 64 slides around the nut 56 periphery and the compressed spring 54 sets the tension. Continued rotation of the drive nut 60 may result in the plunger 64 extending into the next slot 122, however the plunger nose 80 will again ride over the angled edge 132, depress, and pin 82 will remain unable to further rotate the nut 56 in the tightening direction.

The thrust bearing 66 virtually eliminates a secondary torque path between the outer shell 52 and the nut 56. It makes certain the outer shell 52 cannot rotationally drive the lower end of the spring 54, causing the spring 54 to rotationally drive the bottom of the nut 56. In this manner, when the torque path between pin 82 and partial wall 130 is disengaged, no significant torque will be transmitted to the clutch nut.

Momentarily ignoring the effect of weight, and being consistent with FIG. 1 in which the motor 26 is pulling on center and the drive belt has two legs coming off pulleys of equal diameter, the tension in the belt is ½ of the tension in the rod 32. By way of example, to put 50 lbs force into the belt, the rod 32 would be carrying 100 lbs. If it was desired for the nut 56 to move 0.1 inch relative to the housing outer shell 52, the spring constant of the spring 54 should be 1000 lb/in. Or, put another way, given that an assembled clutch 48 includes a spring 54 with a spring constant of 1000 lb/in, then a movement of 0.1 inch of the nut 56 relative to the outer shell 52 will occur when the rod 32 tension is 100 lbs and the belt tension is 50 lbs.

Considering the effect of weight from the motor 26, drive pulley 24, and carrying structure 30, as shown in the present embodiment and using for example, a total weight of 50 lbs being pulled vertically upward, then the rod 32 static tension would be 150 lbs. The resultant spring rate would be 1500 lb/in for a desired nut 56 movement of 0.1 inch relative to the outer shell 52.

Although the example used is a simple one, the belt tensioner may be used with more complicated configurations. These include but are not limited to multiple pulleys and belts, driving from an off-center location, and not being vertically above the spindle.

When the clutch 48 slips signaling to the mechanic that the belt has been tensioned and no more can be applied, the mechanic tightens the fasteners 42 holding the sliding plate 34. The clutch 48 has served its purpose until it is again time to adjust the belt tension.

It is notable that the entire tightening process just described set a belt tension directly related to the force 120 in the rod 32. This will be true whether or not the interface between the threads 116 and 118 is low torque or high torque (as if rusted). Therefore a belt tensioning device 10 of the current embodiment will work the same with a dirty and rusted rod as it would with a new one. The mechanic may exert a higher level of torque with a rusted rod to get the nut 56 to rotate and raise the rod 32, but this will not translate into excessive belt tension. Similarly, the mechanic does not install a belt too loosely by stopping when a torque wrench trips-out due to rod-rust, even though the belt 16 has not been properly tensioned. Although rod-rust is used in the present description, similar conditions, for example rough threads, may be overcome by the present invention.

When the mechanic wishes to remove the belt 16 and install a new one, the mechanic will wish to move the motor axis 28 closer to the spindle axis 22. It is necessary to move the rod 32 through the nut 56 in the direction opposite the previous direction. To do so the mechanic turns the drive nut 60 in the opposite (loosening) direction as indicated by the arrows around the outer shell 52 in FIG. 4E. The plunger pin 82 enters the slot 122 (FIG. 4F) and contacts the full wall 126 positively driving the nut in the reverse direction.

Although the embodiment illustrated has the lower end of the rod 32 connected to the sliding plate 34 to lift it, a different shape and arrangement (not shown) of the sliding plate 34 can be configured in which the upper end of the rod 32 pushes up on block 36 positioned above the support plate 46. The clutch 48 will work equally as well in this case. It does not matter whether the tension force 120 in the lower part of the rod 32 pulls down on the nut 56, or instead a compression force (not shown) pushes down on the nut 56 through the portion of the rod 32 above the nut 56. The clutch 48 will work the same in either case.

However, the clutch 48 will not function correctly if installed upside down in the given example, or in any orientation where the force does not compress the spring 54. To guard against incorrect application the grommet 58 is retained inside the drive nut 60 by retainers 150 or by press-fit or other suitable means. When the drive nut 60 is assembled to the outer shell 52, flexible fingers 152 are proximate the nut 56. As shown in FIG. 5A and previous figures, a rod 32 that has first passed through the nut 56 will part the fingers and protrude (FIG. 1) through the drive nut 60. However a rod 32 first brought through the drive nut 60 will be prevented from engaging with the nut 56 when the fingers 152 are unable to flex open due to contact with the nut 56 (FIG. 5B).

This embodiment of the one-way insertion limiter in the form of a flexible fingered grommet 58 is just one embodiment. One skilled in the art could think of other devices to prevent incorrect insertion. However the grommet 58 is an economical solution using a material that is not inherently strong, but receives its strength from its proximity to the top surface 144 of the nut 56.

Another aspect of using the belt tensioning device 10 involves setting or calibrating its tension limit. The tension limit of the device can be adjusted in several fashions including 1) substituting springs 54 having different spring constants, 2) adding or removing shim washers (not shown) to change the preload of the spring 54, and 3) adjusting plunger 64 insertion in the outer shell 52.

For calibration method 1), spring 54 deflection stays the same because the critical point 134 is defined purely by the travel distance of the nut 56 relative to the plunger 64. Spring 54 load is defined by the deflection. Because the deflection is fixed, the tension limit has a direct relationship with spring rate. Replacing the spring 54 with another having a higher or lower spring rate changes the tension limit setting.

In calibration method 2), shims (washers) not shown, can be located on either end of the spring 54, or anywhere in the spring 54 compressive region. The shim(s) increase spring 54 preload and ultimately the tension limit setting.

In calibration method 3) plunger 64 insertion-adjustment changes the critical point 134 at which the pin 82 disengages the partial wall 130. Moving the plunger 64 in the mount recess 96 so the plunger nose 80 extends closer to the rod 32 moves the critical point 134 in the direction towards the top surface 144. Hence the greater the compression of the spring 54 before the plunger 64 disengages, and the greater the tension limit setting.

Clutches 48 may be set to a specific tension limit prior to being installed as a part of a new belt tensioner 10. These would be set considering the weight of the motor 26 drive pulley 24, and carrying structure 30 associated with the belt tensioning device 10 on which the clutch 48 is associated.

When retrofitting existing belt tensioners 10 with clutches 48 of the current invention, the clutch 48 may be set for the weight and belt tension that the customer specifies. Alternatively, clutches 48 may be set and stocked with their tension limit expressed in a data table or formula that expresses tension achieved according to the weights of motor 26, drive pulley 24, and carrying structure 30 components present.

Figure 6A:
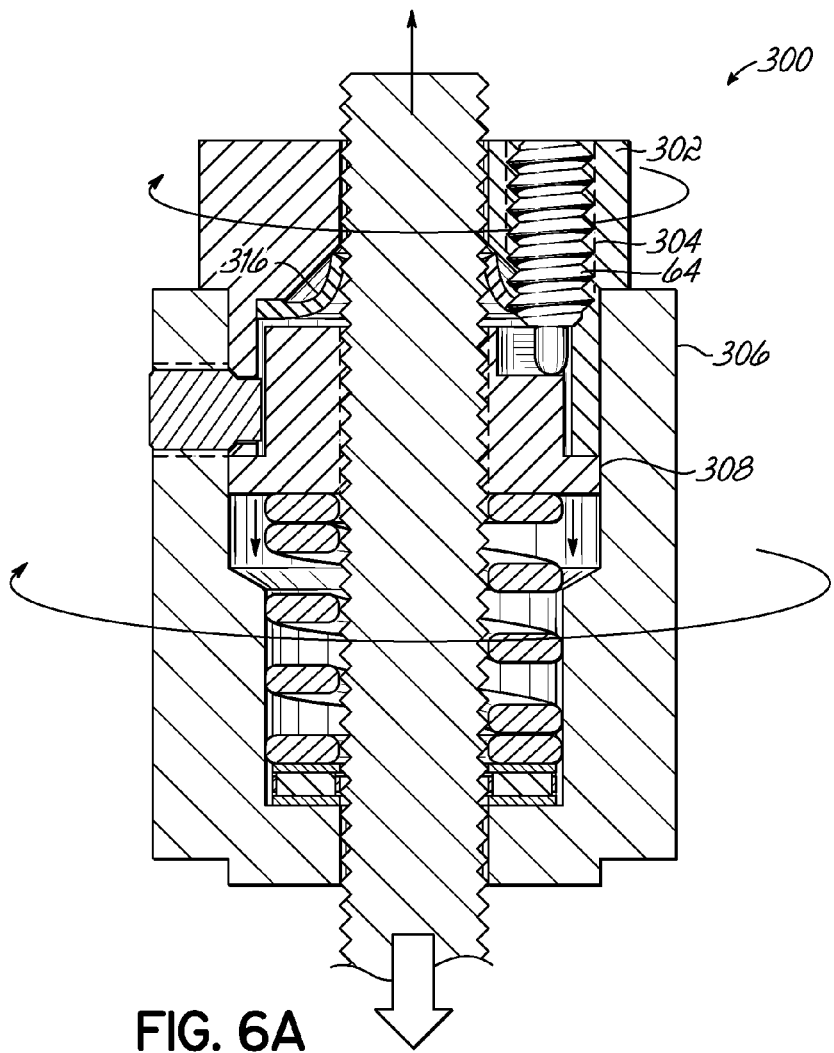
FIGS. 6A-6C illustrate a second preferred embodiment of a belt tensioning device.
Figure 6B:
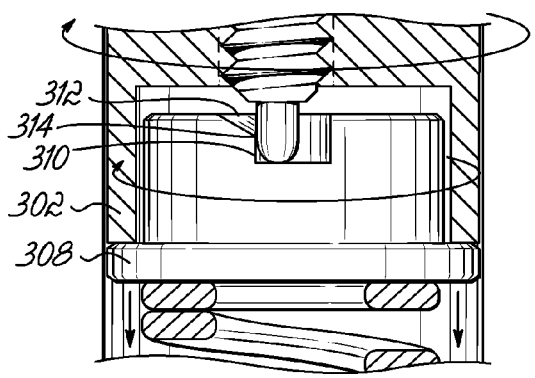
Figure 6C:
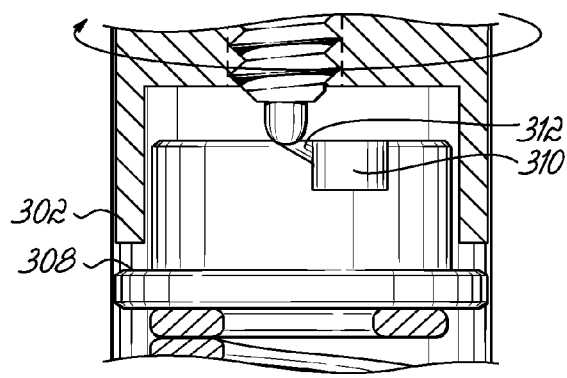

FIGS. 6A-6C illustrate an embodiment of a clutch 300. In this embodiment a drive nut 302 has a mount recess 304 holding a plunger 64. An outer shell 306 does not have a mount recess. A clutch nut 308 has a slot 310 with relief 312. As with nut 56 there may be a plurality of slots 310 and reliefs 312. The relief 312 may be made of many scallops or be a continuous surface. Instead of a critical point 134 there is a critical edge 314 where slot 310 meets relief 312. The principals of operation are the same as they are for clutch 48, however spring rate of the spring 84 in the plunger should be significantly less than the spring rate of spring 54 to reduce the unloading effect of the plunger 64 pushing down on the clutch nut 308. Grommet 316 is a shape that can be placed between drive nut 302 and clutch nut 308.

Figure 7A:
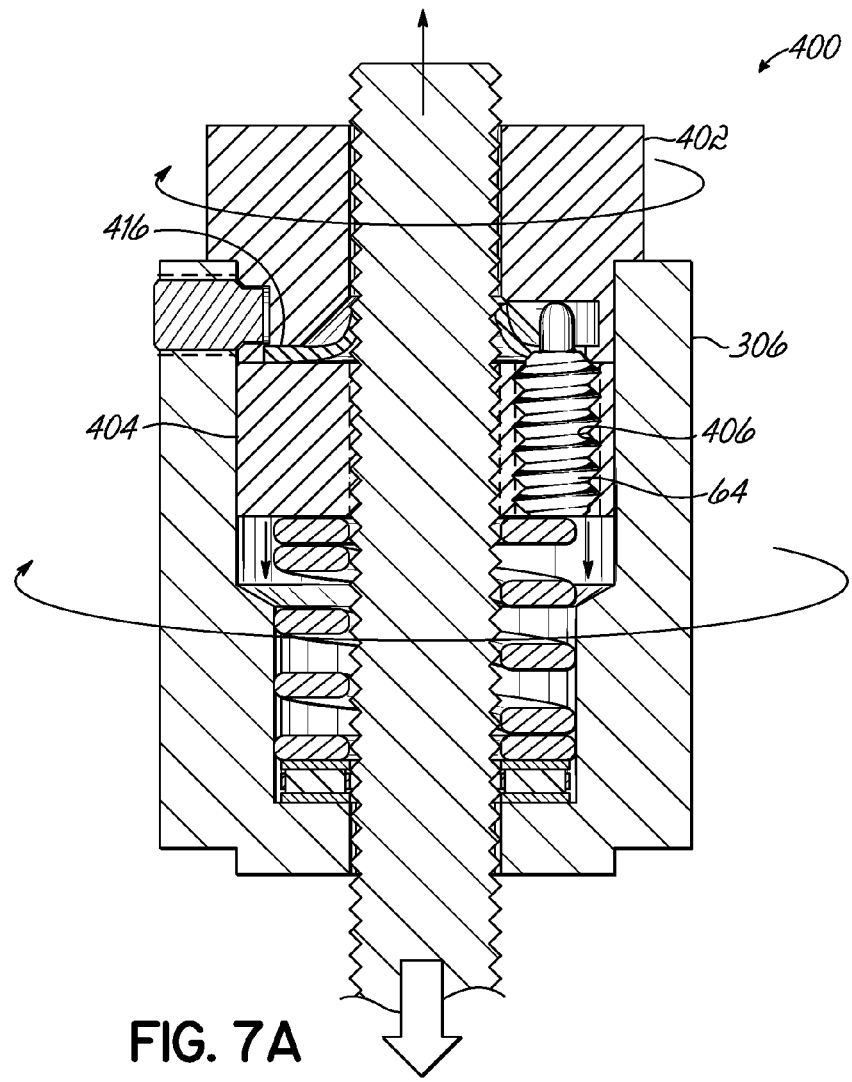
FIGS. 7A-7C illustrate a third preferred embodiment of a belt tension limiting device.
Figure 7B:
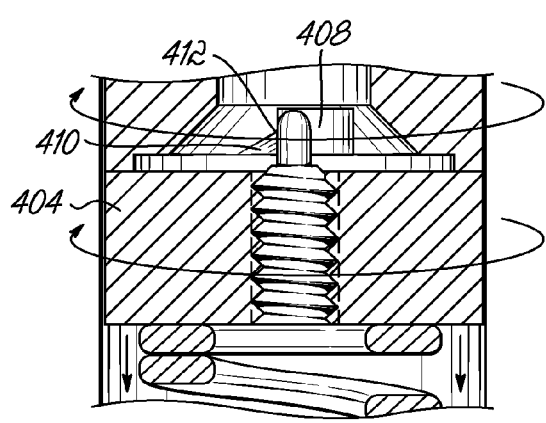
Figure 7C:
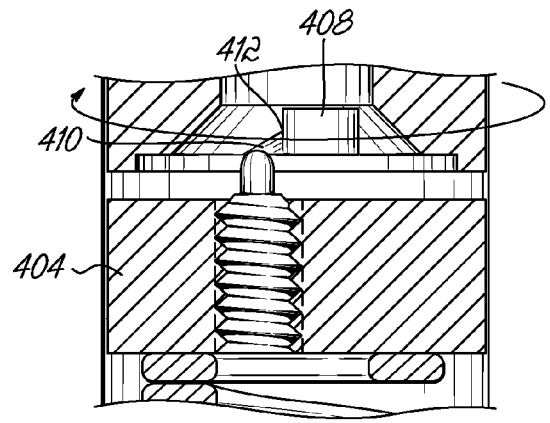

FIGS. 7A-7C illustrate an embodiment of a clutch 400 similar to embodiment 300. In this embodiment a clutch nut 404 has a mount recess 406 holding a plunger 64. Outer shell 306 does not have a mount recess. A drive nut 402 has a slot 408 with a relief 410. As with nut 56 there may be a plurality of slots 408 and reliefs 410. The relief 410 may be made of many scallops or of a continuous surface. There is a critical edge 412 where slot 408 meets relief 410. The principals of operation are the same as they are for clutch 300. Grommet 416 is a shape that can be placed between drive nut 402 and clutch nut 404.

In embodiments 300 and 400, if the plunger 64 is not fully extended at the beginning, then as the nut 56 moves downward and away from the drive nut 60, the plunger pin 82 may continue to extend, resulting in no relative movement between the plunger nose 80 and the slot 310 bottom. It is not until the plunger 64 is fully extended, or stops extending, that relative movement will bring the nose 80 to a critical edge 314, 412. Appropriate choices for plunger stroke, plunger insertion, and critical edge 314, 412 placement are used.

Although the illustrated embodiments have used a coiled compression spring 54, a tensioning member may be other items, for example an elastic cylinder, a pneumatic or hydraulic cylinder with appropriate connections and valves, or a variable resistance electromechanical device. Devices contemplated include adjustability through external means, such as magnetic fields or other environmental conditions that do not require disassembly and reassembly of the clutch.

Although coiled compression springs tend to have a gradual deformation under increasing load, other tensioning members may not be so gradual. When deformation is gradual, the critical point or critical edge will be approached gradually and the belt tension at the triggering point will remain as the final belt tension. However if a tensioning member is used that has little or no deformation under increasing load, followed by rapid deformation to cause disengagement, then the movement of the rod may be significant enough to change the final belt tension to something less than the trigger belt tension. In such cases, a tension trigger point can be chosen that is greater enough to compensate.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A belt tensioning device for preventing excess tension on a spindle, comprising:
 a spindle aligned along, and drivable about, a spindle axis;
 an endless belt operatively connected to the spindle;
 a rotational driver aligned along a drive axis, the rotational driver also operatively connected to the endless belt and operable to drive the endless belt so as to rotatably drive the spindle;
 a fixed structure located adjacent the spindle and the rotational driver;
 a carrying structure supporting the rotational driver, including a rod extending away from the drive axis;
 a clutch supported on the fixed structure and operatively connected to the rod, the clutch adapted to cooperate with the rod to selectively move the drive axis towards/away from the spindle axis, thereby to loosen/tighten the endless belt, the clutch further including:
 a nut operatively connected to the rod;
 an outer shell surrounding the rod, one of the nut and the outer shell having a mounting recess and the other of the nut and the outer shell having a slot;
 a tensioning member that supplies a variable resisting force that resists movement of the nut and the rod relative to the structure;
 an engagement member having an extended state and a retracted state, the engagement member being mounted in said mounting recess and in an extended state so as to co-act with said slot, such that rotation of the outer shell in a first rotational direction causes rotation of the nut, and thereby moves the rod and the drive axis in a direction away from the spindle axis so as to tension the endless belt while the resisting force resists movement of the nut toward the spindle axis, whereby continued rotation of the outer shell in the first rotational direction continues to increase the tension of the belt so as to eventually overcome an initial resisting force, whereby the nut begins to move toward the spindle axis, and still further rotation of the outer shell causes the nut to move a sufficient distance to cause the engagement member to transition to the retracted state and to disengage from the slot, such that, thereafter, any further rotation of the outer shell in the first rotational direction causes no further rotation of the nut, and wherein subsequent rotational movement of the outer shell in a second rotational direction opposite the first rotational direction causes the engagement member to transition back to the extended state and to re-engage with the slot, thereby to cause the nut to rotate in the second rotational direction and to move the rod and the drive axis toward the spindle axis; and a rolling element thrust bearing located adjacent the tensioning member, thereby to facilitate rotational movement of the outer shell relative to the nut after the engagement member has disengaged from the slot.

2. The device of claim 1 wherein the tensioning member is aligned parallel with the rod.

3. The device of claim 2 wherein the tensioning member is a coil spring arranged coaxially with the rod.

4. The device of claim 3 wherein the rotational force applied in the first rotational direction to cause the engagement member to disengage from the slot is predetermined.

5. The device of claim 3 wherein the amount of movement of the nut toward the spindle axis to cause the engagement member to disengage from the slot is predetermined.

6. The device of claim 1 wherein the tensioning member is removably mounted relative to the clutch, such that the resisting force supplied by the tensioning member can be changed, thereby to enhance the operational capability of the device.

7. The device of claim 1 wherein the nut threadably engages the rod.

8. The device of claim 1 wherein the mounting recess is located in the outer shell and the slot is located in the nut, and the engagement member farther comprises a spring-loaded plunger, a first end of the spring-loaded plunger being seated within the mounting recess of the outer shell and a second end of the spring-loaded plunger engaging the slot in the nut, the spring loaded plunger being biased to the extended state.

9. The device of claim 8 wherein the engagement member is oriented perpendicular to the rod.

10. The device of claim 8 wherein the engagement member is oriented parallel to the rod.

11. The device of claim 1 wherein the slot has a relieved surface that co-acts with the engagement member.

12. The device of claim 1 wherein said other of the nut and the outer shell has at least two slots spaced around an outer circumference of the rod.

13. The device of claim 1 wherein the outer shell has a surface engageable via a conventional handheld tool.

14. The device of claim 1 wherein the carrying structure comprises a plate secured to the rod and slidable relative to the fixed structure.

15. The device of claim 1 wherein the rod is oriented perpendicular to the drive axis.

16. The device of claim 1 wherein the rotational driver is a motor and the drive axis is a motor axis.

17. The device of claim 1 wherein the fixed structure comprises a horizontal plate, and the rod extends through a hole in the plate.

18. The device of claim 1 wherein the clutch further comprises:

a grommet located within the outer shell and operative to permit threadable insertion of the rod into the nut from one direction only.

19. A force limiting device comprising:

a fixed structure;

a rod located adjacent the fixed structure, the rod having external threads;

means for applying a force on one end of the rod;

a clutch supported on the fixed structure and operatively connected to the rod, the clutch adapted to cooperate with the rod to selectively move the rod relative to the fixed structure, the clutch further including:

a nut threadably connected to the rod;

an outer shell surrounding the rod;

a tensioning member that supplies a variable resisting force that resists movement of the nut and the rod relative to the structure;

engagement means for engageably cooperating with the nut, the engagement means having an extended state and a retracted state, such that rotation of the engagement means in a first rotational direction and with the engagement means in the extended state causes rotation of the nut and also causes the rod to move in a first desired direction against the force applied by said means for applying a farce on one end of the rod, whereby continued rotation in the first rotational direction eventually causes the engagement means to transition to the retracted state and to disengage from the nut, such that further rotation in the first rotational direction causes no further movement of the rod in the first desired direction, and wherein subsequent rotational movement of the engagement means in a second rotational direction, opposite the first rotational direction, causes another transition back to the extended state and reengagement of the engagement means and the nut so as to cause the nut to rotate in the second rotational direction and thereby move the rod in a second desired direction that is opposite the first desired direction; and a rolling element thrust bearing located adjacent the tensioning member, thereby to facilitate rotational movement of the outer shell relative to the nut after the engagement means has disengaged.

20. The tension limiting device of claim 19 wherein the fixed structure is operatively connected to a spindle having a spindle axis and the means for applying a force includes a rotational drive device having a drive axis, and the distance between the spindle axis and the drive axis can he changed by manipulating the clutch relative to the rod.

21. The force limiting device of claim 19 wherein the means for applying a force applies a pulling force in a second direction.

22. The force limiting device of claim 19 wherein the means for applying a force applies a pushing force in a second direction.

23. A device fur tensioning a belt comprising:

a tensioning member that changes its length when compressed by a force that increases with increased belt tension:

a nut;

a rod transmitting the force into the nut so that the tension in the belt acts on the nut to compress the tensioning member;

an outer shell coupled to the nut by an engagement member that extends and retracts so that rotation of the outer shell in a first direction, with the engagement member extended, rotates the nut and the nut moves the rod through the nut to increase the tension in the belt and compress the tensioning member until the belt has the desired tension, at which time the engagement member retracts and disengages and no longer couples the outer shell and nut during rotation in the first direction; and a rolling element thrust bearing located adjacent the tensioning member, thereby to facilitate rotational movement of the outer shell relative to the nut after the engagement member has disengaged.

24. The device of claim of claim 23 further comprising a first full surface on at least one of the nut and the outer shell where the engagement member couples the nut and the outer shell so that when the outer shell is turned in a second direction opposite the first direction, the engagement member couples the outer shell and the nut so that rotation of the outer shell in the second direction causes the nut to rotate in the second direction.

25. The device of claim 24 further comprising a second partial surface on at least one of the nut and the outer shell where the engagement member couples the nut and the outer shell.

26. The device of claim 25 further comprising a progressive taper relief surface adjacent the second partial surface at which the engagement member cannot couple the nut and the outer shell.

27. The device of claim 24 further comprising:
a second partial surface on at least one of the nut and the outer shell where the engagement member couples the nut and the outer shell, to further facilitate coupling of the engagement member and the nut and the outer shell.

28. The device of claim 23 wherein the rolling element thrust bearing resides between the tensioning member and the outer shell.

29. The device of claim 23 further comprising a drive nut removably coupled to the outer shell.

30. The device of claim 23 further comprising a grommet located within the outer shell and operative to permit threadable insertion of the rod into the nut from one direction only.

31. A belt tensioning device for preventing excess tension on a spindle, comprising:
a spindle aligned along, and drivable about, a spindle axis;
an endless belt operatively connected to the spindle;
a rotational driver aligned along a drive axis, the rotational driver also operatively connected to the endless belt and operable to drive the endless belt so as to rotatably drive the spindle;
a fixed structure located adjacent the spindle and the rotational driver;
a carrying structure supporting the rotational driver, including a rod extending away from the drive axis;
a clutch supported on the fixed structure and operatively connected to the rod, the clutch adapted to cooperate with the rod to selectively move the drive axis towards/away from the spindle axis; thereby to loosen/tighten the endless belt, the clutch further including:
a nut operatively connected to the rod;
an outer shell surrounding the rod, one of the nut and the outer shell having a mounting recess and the other of the nut and the outer shell having a slot;
a tensioning member that supplies a variable resisting force that resists movement of the nut and the rod relative to the structure;
an engagement member having an extended state and a retracted state, the engagement member being mounted in said mounting recess and in an extended state so as to co-act with said slot, such that rotation of the outer shell in a first rotational direction causes rotation of the nut, and thereby moves the rod and the drive axis in a direction away from the spindle axis so as to tension the endless belt while the resisting force resists movement of the nut toward the spindle axis, whereby continued rotation of the outer shell in the first rotational direction continues to increase the tension of the belt so as to eventually overcome an initial resisting force, whereby the nut begins to move toward the spindle axis, and still further rotation of the outer shell causes the nut to move a sufficient distance to cause the engagement member to transition to the retracted state and to disengage from the slot, such that, thereafter, any further rotation of the outer shell in the first rotational direction causes no further rotation of the nut, and wherein subsequent rotational movement of the outer shell in a second rotational direction opposite the first rotational direction causes the engagement member to transition back to the extended state and to reengage with the slot, thereby to cause the nut to rotate in the second rotational direction and to move the rod and the drive axis toward the spindle axis; and a grommet located within the outer shell and operative to permit threadable insertion of the rod into the nut in one direction only.

32. A force limiting device comprising:
a fixed structure;
a rod located adjacent the fixed structure, the rod having external threads;
means for applying a force on one end of the rod;
a clutch supported on the fixed structure and operatively connected to the rod, the clutch adapted to cooperate with the rod to selectively move the rod relative to the fixed structure, the clutch Author including:
a nut threadably connected to the rod;
engagement means for engageably cooperating with the nut, the engagement means having an extended state and a retracted state, such that rotation of the engagement means in a first rotational direction and with the engagement means in the extended state causes rotation of the nut and also causes the rod to move in a first desired direction against the force applied by said means for applying a force on one end of the rod, whereby continued rotation in the first rotational direction eventually causes the engagement means to transition to the retracted state and to disengage from the nut, such that further rotation in the first rotational direction causes no further movement of the rod in the first desired direction, and wherein subsequent rotational movement of the engagement means in a second rotational direction, opposite the first rotational direction, causes another transition back to the extended state and reengagement of the engagement means and the nut so as to cause the nut to rotate in the second rotational direction and thereby move the rod in a second desired direction that is opposite the first desired direction; and a grommet located adjacent to the nut and operative to permit threadable insertion of the rod into the nut in one direction only.

33. A device for tensioning a belt comprising:
a tensioning member that changes its length when compressed by a force that increases with increased belt tension;

a nut;

a rod transmitting the force into the nut so that the tension in the belt acts on the nut to compress the tensioning member;

an outer shell coupled to the nut by an engagement member that extends and retracts so that rotation of the outer shell in a first direction, with the engagement member extended, rotates the nut and the nut moves the rod through the nut to increase the tension in the belt and compress the tensioning member until the belt has the desired tension, at which time the engagement member retracts and disengages and no longer couples the outer shell and nut during rotation in the first direction; and a grommet located within the outer shell and operative to permit threadable insertion of the rod into the nut from one direction only.

* * * * *